United States Patent [19]
Yates, III

[11] Patent Number: 5,967,180
[45] Date of Patent: Oct. 19, 1999

[54] CHECK VALVE

[75] Inventor: William M. Yates, III, Santa Ynez, Calif.

[73] Assignee: McLaren Automotive Group, Inc., Santa Barbara, Calif.

[21] Appl. No.: 09/041,331

[22] Filed: Mar. 12, 1998

[51] Int. Cl.$^6$ .................................................. F16K 15/00
[52] U.S. Cl. .................... 137/539; 137/539; 137/533.13; 137/533.19
[58] Field of Search ............................... 137/512.1, 539, 137/533.13, 533.19

[56] References Cited

U.S. PATENT DOCUMENTS

| | | | |
|---|---|---|---|
| 751,758 | 2/1904 | Small | 137/533.13 |
| 1,054,599 | 2/1913 | Murphy | 137/533.13 |
| 1,672,394 | 6/1928 | Sargent | 137/533.13 |
| 1,876,522 | 9/1932 | Beecher | 137/533.13 |
| 1,936,975 | 11/1933 | Wasson | 137/533.13 |
| 1,980,833 | 11/1934 | Sims | 137/512.1 |
| 2,065,783 | 12/1936 | Woodbridge | 137/533.13 |
| 2,913,168 | 11/1959 | Heidorn | 137/512.1 |
| 3,219,057 | 11/1965 | Knowles . | |
| 3,343,564 | 9/1967 | Peeples et al. . | |
| 3,880,130 | 4/1975 | Hecht . | |
| 4,091,839 | 5/1978 | Donner . | |
| 4,365,648 | 12/1982 | Grotha . | |
| 4,428,464 | 1/1984 | Miura . | |
| 4,700,741 | 10/1987 | Murphy . | |
| 5,183,075 | 2/1993 | Stein . | |
| 5,310,388 | 5/1994 | Okcuoglu et al. . | |
| 5,536,215 | 7/1996 | Shaffer et al. . | |
| 5,595,214 | 1/1997 | Shaffer et al. . | |
| 5,662,138 | 9/1997 | Wang | 137/533.13 |
| 5,799,689 | 9/1998 | Tang et al. | 137/533.13 |

*Primary Examiner*—Denise L. Ferensic
*Assistant Examiner*—Joanne Y. Kim
*Attorney, Agent, or Firm*—Brooks & Kushman P.C.

[57] ABSTRACT

A check valve (12) includes a cage (14) having a tubular side wall (16) including outward and inward undulations (28,30) that provide fluid flow through the check valve and externally thereof as well as providing guiding of an associated valve element ball (36).

12 Claims, 2 Drawing Sheets

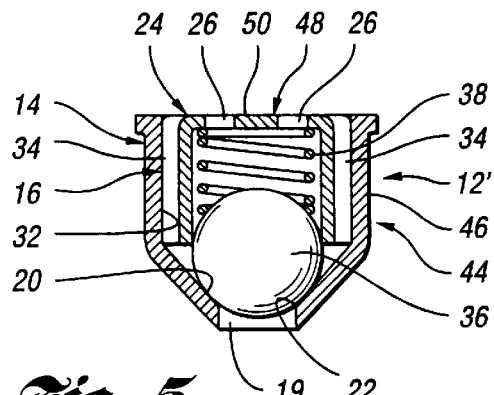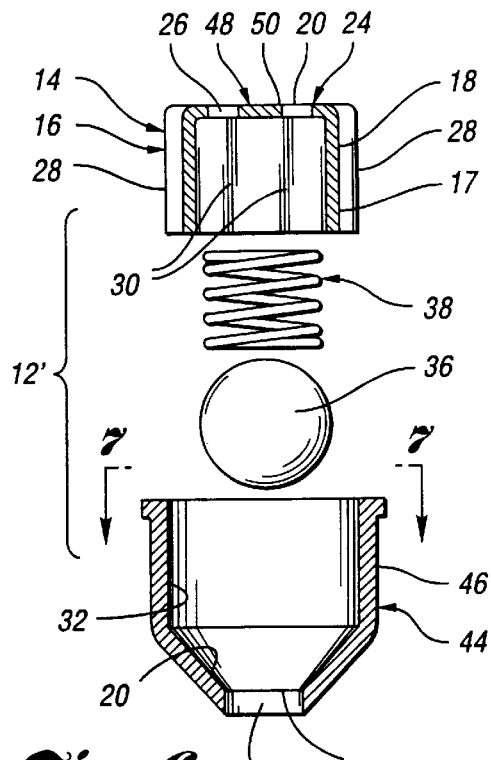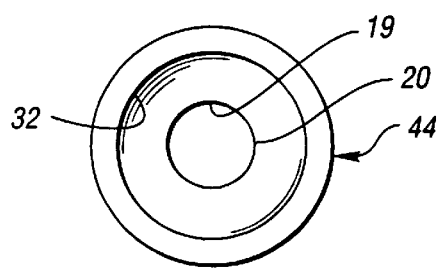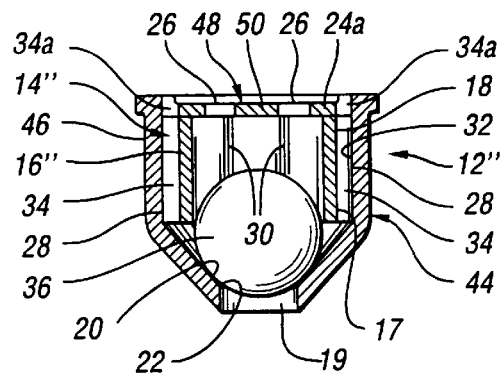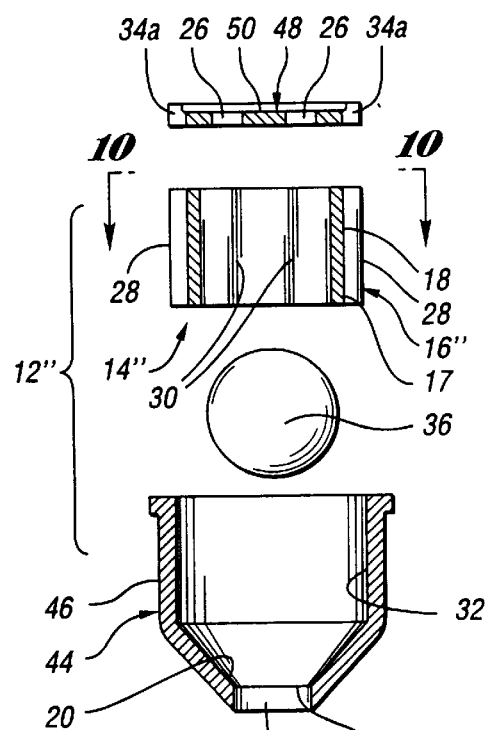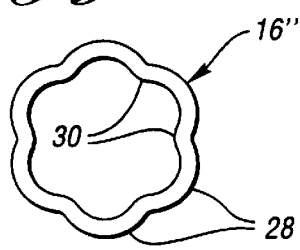

CHECK VALVE

TECHNICAL FIELD

This invention relates to a check valve that has particular utility for use with hydraulic couplings for vehicle drivetrains.

BACKGROUND ART

Check valves are utilized for hydraulic fluid flow in vehicle drivetrain couplings such as disclosed by U.S. Pat. Nos. 5,310,388 Okcuoglu et al., 5,536,215 Shaffer et al., and 5,595,214 Shaffer et al., the entire disclosures of which are hereby incorporated by reference. One consideration with check valves is that the fluid flow that can pass through the valve in its open position is limited by the valve element since the fluid must flow around the valve element and the valve bore in which the valve element is located cannot be too large to increase fluid flow or there will not be proper guiding of the valve element in its movement to the closed position.

U.S. Pat. No. 4,428,464 Miura discloses a hydraulic damper having a valve that includes a generally flat valve element that is movable within a valve guide that has indentations for providing guiding movement during movement between open and closed positions. Other check valves are disclosed by U.S. Pat. Nos.: 3,219,057 Knowles; 3,343,564 Peeples et al.; 3,880,130 Hecht; 4,091,839 Donner; 4,365,648 Grothe; 4,700,741 Murphy; and 5,183,075 Stein.

DISCLOSURE OF INVENTION

An object of the present invention is to provide an improved check valve.

In carrying out the above object, a check valve according to the invention has a cage including a tubular wall having an upstream end and a downstream end, and with the upstream end of the tubular wall being open to receive fluid flowing downstream through a passage and past an annular seat that diverges from a round edge at which the passage terminates. The cage includes a downstream end that partially closes the downstream end of the tubular wall but includes openings through which the fluid can flow in a downstream direction therethrough. The tubular wall has a generally round shape including radially extending outward and inward undulations such that insertion of the cage into a valve bore downstream from the seat permits fluid flow in a downstream direction externally of as well as through the cage. A valve element of the valve is embodied by a ball received within the tubular wall of the cage and guided by its inward undulations. The ball has a sufficiently large diameter so as to engage the seat at a spaced relationship from the round edge at which the passage terminates.

The manner in which the radially extending outward and inward undulations permit fluid flow in a downstream direction both externally of the cage as well as through the cage permits increased fluid flow, while the guiding of the valve element ball by the inward undulations provides a precise guiding to the closed position with the ball spaced from the round edge where the passage terminates so that there is no edge wear that could cause eventual leakage.

In one preferred construction, the valve also includes a spring that biases the ball toward the seat to close the passage. This spring is disclosed as being round and having a downstream end seated by the downstream end of the cage and an upstream end that seats against the ball. Best results are achieved when the round spring has a cylindrical shape of a helical construction.

The cage of the check valve is disclosed as having different embodiments. In one embodiment, the cage has its tubular wall and downstream end unitary with each other and is preferably made with a drawn construction. Another embodiment of the cage has the tubular wall and downstream end of the cage made with a two-piece construction, preferably with the tubular wall having an extruded construction defining the radially extending outward and inward undulations.

The outward and inward undulations of the tubular wall of the cage are curved with the outward undulations having a greater radius of curvature than the inward undulations. Also, the downstream end of the cage is constructed to include a spider having a central portion and legs projecting from the central portion to the downstream end of the tubular wall to define the openings through which the fluid flows through the cage. The cage has the same number of outward undulations as the number of openings in the downstream end of the cage, and the openings of the downstream end of the cage are in respective alignment with the outward undulations of the tubular wall of the cage.

The check valve is disclosed in one practice as being mounted within a component that defines the passage and seat as well as being constructed to provide other functions. Other embodiments also include a valve housing that defines the passage, the valve seat, and the valve bore, and the valve housing includes an external surface that provides mounting of the check valve for use such that it provides a self-contained unit.

The objects, features and advantages of the present invention are readily apparent from the following detailed description of the best modes for carrying out the invention when taken in connection with the accompanying drawings.

BRIEF DESCRIPTION OF DRAWINGS

FIG. 5 is a sectional view taken through another embodiment of the valve which is like the embodiment of FIGS. 1–4 but additionally includes a housing that mounts the cage such that the check valve is a self-contained unit.

FIG. 6 is an exploded view of the check valve illustrated in FIG. 5 to further illustrate its construction.

FIG. 7 is a view taken along the direction of line 7—7 in FIG. 6 to illustrate the round construction of the valve housing.

FIG. 8 is a sectional view through another embodiment of the check valve which is similar to the embodiment of FIGS. 5–7 but has its cage made with a two-piece construction and is also constructed without any biasing spring for the valve element ball.

FIG. 9 is an exploded view of the embodiment of the check valve shown in FIG. 8.

FIG. 10 is an end view taken along the direction of line 10—10 in FIG. 9 to illustrate the construction of the cage tubular wall.

BEST MODES FOR CARRYING OUT THE INVENTION

Figure 1:
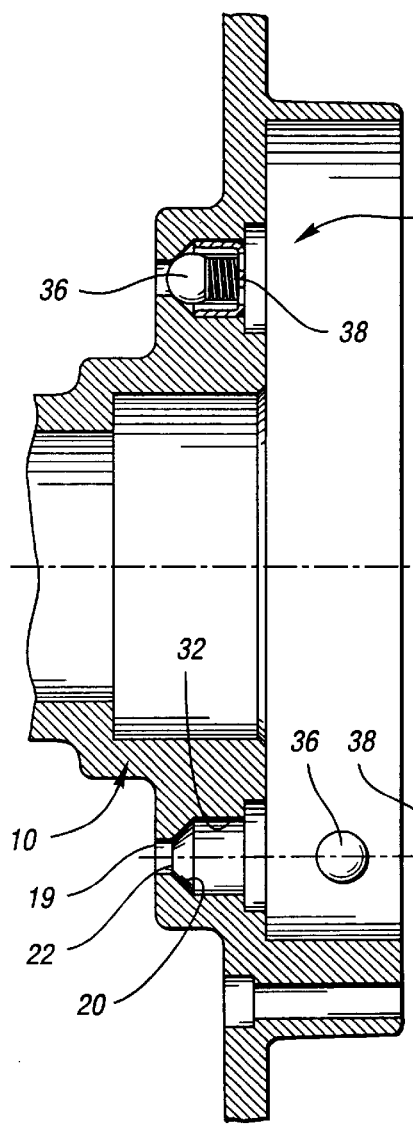
FIG. 1 is a sectional view that illustrates a hydraulic coupling component including check valves according to the present invention with one of the check valves shown assembled and with the other shown in an exploded condition to facilitate an understanding of the valve construction.

With reference to FIG. 1 of the drawings, a component 10 such as a cover for a hydraulic coupling of a vehicle drivetrain is illustrated as having two check valves 12 that are each constructed in accordance to the present invention with one of the check valves shown assembled and the other shown in an exploded condition to further illustrate the understanding of the check valve construction. These check valves 12 permit fluid flow in a downstream direction from the left toward the right, but prevent fluid flow in an upstream direction from the right toward the left so as to thus provide a check valve operation.

Figure 2:
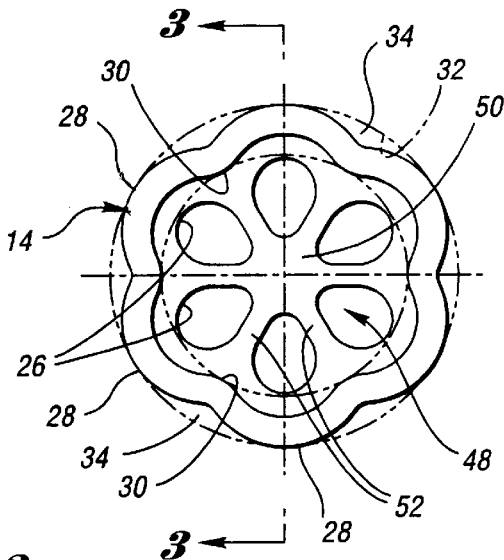
FIG. 2 is an end view taken along the direction of line 2—2 in FIG. 1 to illustrate a cage of the check valve when viewed from an upstream location looking downstream along the direction of fluid flow.
Figure 3:
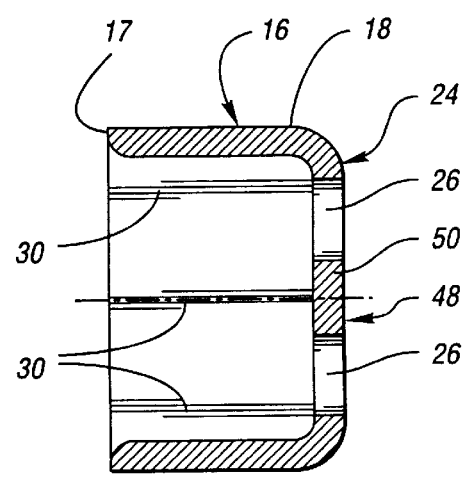
FIG. 3 is a longitudinal sectional view taken through the cage along the direction of line 3—3 in FIG. 2 to further illustrate the construction of the cage.
Figure 4:
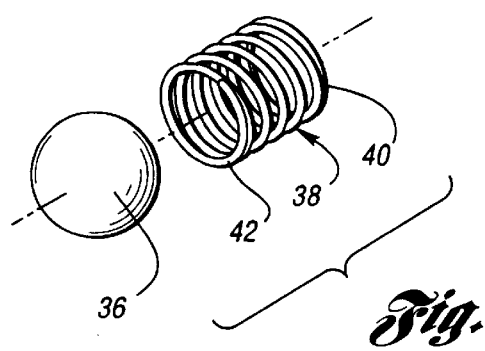
FIG. 4 is an exploded perspective view to further illustrate components of the check valve which, in addition to the cage, include a valve element embodied by a ball and a biasing spring that biases the ball to a closed position.

With continuing reference to FIG. 1 and further reference to FIGS. 2 and 3, the check valve 12 has a cage 14 including a tubular wall 16 having an upstream end 17 and a downstream end 18 best illustrated in FIG. 3. The valve is mounted within the component 10 downstream from an associated round passage 19 and an adjacent annular seat 20 that diverges from a round edge 22 at which the passage terminates. The cage 14 has its upstream end 17 constructed so as to be open to receive fluid flowing downstream through the passage 19 past its terminal round edge 22 and the adjacent annular seat 20. The cage 14 also includes a downstream end 24 that is partially closed as illustrated in FIG. 2 but includes openings 26 through which the fluid can flow in a downstream direction therethrough which is toward the right in FIGS. 1 and 3. The tubular wall 16 of the cage 14 as shown best in FIG. 2 includes radially extending outward and inward undulations 28 and 30. Insertion of the cage 14 into an associated valve bore 32 in the component 10 downstream from the annular seat 20 permits fluid flow in a downstream direction not only through the cage through the openings 26 shown in FIG. 2 but also externally of the cage through circumferentially spaced channels 34 cooperatively defined by the adjacent pairs of outward undulations 28 and the valve bore 32. The valve cage 14 is suitably secured within the valve bore 32 such as by a press fit.

Each check valve 12 also includes a valve element embodied by a ball 36 received within the tubular wall 16 of the cage 14 and guided by its inward undulations 30 between the closed position as shown by the upper check valve in FIG. 1 and an open position to the right of the closed position. The ball 36 has a sufficiently large diameter so as to engage the annular seat 20 in a spaced relationship from the round edge 22 at which the passage 19 terminates. As such, the round edge 22 does not wear by repeated engagement of the ball 36 upon closing during the valve operation and thereby prevents leakage and valve misfunction.

The embodiment of the valve 12 illustrated in FIGS. 1–4 also includes a spring 38 that biases the ball 36 toward the annular seat 20 to close the passage 19. This spring 38 is preferably round and has a downstream end 40 seated by the downstream end 24 of the cage and also has an upstream end 42 that seats against the ball 36. The round spring 38 preferably has a cylindrical shape of a helical construction so as to provide the best biasing of the valve element ball 36 to the closed position.

The above-described embodiment of the check valve 12 has the cage 14 provided with a unitary construction between its tubular wall 16 and downstream end 24 that defines the openings 26. This construction is preferably of a drawn construction wherein a flat metal cage blank is engaged by a tool to draw the generally cup-shaped construction illustrated. However, it should be appreciated that the unitary cage construction can be made in other ways such as by machining of metals or other materials, or by injection molding plastics, etc.

With reference to FIGS. 5–7, another embodiment of the valve 12' has the same construction as the valve 12 described above in connection with FIGS. 1–4 but has a self-contained construction provided by a valve housing 44 that receives the cage 14, the valve element ball 36, and the biasing spring 38. More specifically, this housing 44 defines the passage 19 and the annular seat 20 as well as the round passage edge 22 and the valve bore 32. Thus, in this construction, the outward undulations 28 cooperate with the valve bore 32 defined by the valve housing 44 to define the channels 34 through which the fluid flows externally of the cage 14 in a downstream direction which is upward as viewed in FIG. 5. Furthermore, the valve housing 44 has an external surface 46 that provides for mounting of the check valve 12' for use in any suitable manner. The housing 44 is preferably made by drawing a metal blank but can also be made in other ways such as by machining or injection molding from plastic.

With reference to FIGS. 8–10, another embodiment of the check valve 12" has a construction similar to the previously described embodiments except as will be noted. In this embodiment of the check valve 12", there is no biasing spring which may not be required for some applications. Furthermore, the cage 14" has a two-piece construction with its tubular wall 16" preferably having an extruded construction defining the radially extending outward and inward undulations 28 and 30. Furthermore, the downstream end 24" of the cage 14" may be secured to the downstream end 18 of the tubular wall 16 or may be secured in a suitable manner to the valve housing 44 within its valve bore 32 in any suitable manner such as by a press fit. Also, the downstream end 24" of the cage 14" has channel ends 34a through which the fluid flows externally of the cage from the channels 34.

In each embodiment of the check valve as described above, the outward and inward undulations 28 and 30 of the tubular wall of the cage are curved with the outward undulations 28 having a greater radius of curvature than the inward undulations 30. Furthermore, the downstream end of the cage includes a spider 48 as illustrated in FIG. 2. More specifically, this spider includes a central portion 50 and legs 52 projecting from the central portion to the adjacent downstream end 18 of the tubular wall 16 to define the openings 26 through which the fluid flows through the cage as previously described. The tubular wall of the cage has the same number of outward undulations 28 as the number of openings 26 in the downstream end 24 of the cage. In addition, the openings 26 of the downstream end 24 of the cage are in respective alignment with the outward undulations 28 of the tubular wall of the cage so as to thereby provide a construction that permits a relatively large amount of fluid flow through the cage 14. Also, the openings 26 have teardrop shapes arranged in a flower pedal configuration with their larger blunt ends located outwardly adjacent the outward undulations 28 and with their pointed smaller ends 30 located inwardly adjacent the central portion 50 of the spider 48 so as to increase the fluid flow area.

While the best modes for practicing the invention have been described in detail, those familiar with the art to which this invention relates will recognize various alternative designs and embodiments for practicing the invention as defined by the following claims.

What is claimed is:

1. A check valve comprising:

a cage including a tubular wall having an upstream end and a downstream end, the upstream end of the tubular wall being open to receive fluid flowing downstream through a passage and past an annular seat that diverges from a round edge at which the passage terminates, the cage including a downstream end that partially closes the downstream end of the tubular wall but includes openings through which the fluid can flow in a downstream direction therethrough, and the tubular wall having a generally round shape including radially extending outward and inward undulations such that insertion of the cage into a valve bore downstream from the seat permits fluid flow in a downstream direction externally of as well as through the cage; and a valve element embodied by a ball received within the tubular wall of the cage and guided by its inward undulations, and the ball having a sufficiently large diameter so as to engage the seat in a spaced relationship from the round edge at which the passage terminates.

2. A check valve as in claim 1 further including a spring that biases the ball toward the seat to close the passage.

3. A check valve as in claim 2 wherein the spring is round and has a downstream end seated by the downstream end of the cage and an upstream end that seats against the ball.

4. A check valve as in claim 3 wherein the round spring has a cylindrical shape of a helical construction.

5. A check valve as in claim 1 wherein the tubular wall and downstream end of the cage are unitary with each other.

6. A check valve as in claim 1 wherein the tubular wall has an extruded construction defining the radially extending outward and inward undulations.

7. A check valve as in claim 1 wherein the outward and inward undulations of the tubular wall of the cage are curved with the outward undulations having a greater radius of curvature than the inward undulations.

8. A check valve as in claim 1 wherein the downstream end of the cage includes a spider having a central portion and legs projecting from the central portion to the downstream end of the tubular wall to define the openings through which the fluid flows through the cage.

9. A check valve as in claim 8 wherein the tubular wall cage has the same number of outward undulations as the number of openings in the downstream end of the cage, and the openings of the downstream end of the cage being in respective alignment with the undulations of the tubular wall of the cage.

10. A check valve as in claim 1 further including a valve housing that defines the passage, the valve seat and the valve bore, and the valve housing including an external surface that provides mounting of the check valve for use.

11. A check valve comprising:

a cage including a tubular wall having an upstream end and a downstream end, the upstream end of the tubular wall being open to receive fluid flowing downstream through a passage and past an annular seat that diverges from a round edge at which the passage terminates, the cage including a downstream end having a spider including a central portion and legs projecting from the central portion to the downstream end of the tubular wall to define openings through which the fluid can flow in a downstream direction therethrough, and the tubular wall having a generally round shape including radially extending outward and inward undulations such that insertion of the cage into a valve bore downstream from the seat permits fluid flow in a downstream direction externally of the cage; and a valve element embodied by a ball received within the tubular wall of the cage and guided by its inward undulations, and the ball having a sufficiently large diameter so as to engage the seat in a spaced relationship from the round edge at which the passage terminates.

12. A check valve comprising:

a cage including a tubular wall having an upstream end and a downstream end, the upstream end of the tubular wall being open to receive fluid flowing downstream through a passage and past an annular seat that diverges from a round edge at which the passage terminates, the cage including a downstream end having a spider including a central portion and legs projecting from the central portion to the downstream end of the tubular wall to define openings through which the fluid can flow in a downstream direction therethrough, the tubular wall having a generally round shape including radially extending outward and inward undulations such that insertion of the cage into a valve bore downstream from the seat permits fluid flow in a downstream direction externally of the cage, the outward and inward undulations of the tubular wall of the cage being curved with the outward undulations having a greater radius of curvature than the inward undulations, the tubular wall of the cage having the same number of outward undulations as the number of openings in the downstream end of the cage, and the openings of the downstream end of the cage being in respective alignment with the outward undulations of the tubular wall; and a valve element embodied by a ball received within the tubular wall of the cage and guided by its inward undulations, the ball having a sufficiently large diameter so as to engage the seat in a spaced relationship from the round edge at which the passage terminates, and a helical spring that extends between the downstream end of the cage and the ball to bias the ball to a closed position with the seat.

* * * * *

UNITED STATES PATENT AND TRADEMARK OFFICE
CERTIFICATE OF CORRECTION

PATENT NO. : 5,967,180
DATED : October 19, 1999
INVENTOR(S) : William M. Yates, III It is certified that error appears in the above-identified patent and that said Letters Patent are hereby corrected as shown below:

Column 5, lines 46-47, Claim 9, between "wall" and "cage" please insert --of the--.

Column 5, line 50, before "undulations" please insert --outward--.

Signed and Sealed this

Twenty-fifth Day of July, 2000

Attest:

Q. TODD DICKINSON

Attesting Officer

Director of Patents and Trademarks